United States Patent [19]

Schmitz

[11] 3,796,324
[45] Mar. 12, 1974

[54] APPARATUS FOR SEPARATING ANNULAR WORK PIECES
[75] Inventor: Wilfried Schmitz, Leverkusen, Germany
[73] Assignee: Goetzewerke Friedrich Goetze AG, Burscheid, Germany
[22] Filed: May 16, 1972
[21] Appl. No.: 253,896

[30] Foreign Application Priority Data
May 21, 1971 Germany............................ 2125119

[52] U.S. Cl.............................. 214/8.5 K, 221/298
[51] Int. Cl............................................. B65g 59/06
[58] Field of Search......... 214/8.5 K, 8.5 A; 140/87; 221/298, 312 A

[56] References Cited
UNITED STATES PATENTS
2,432,339   12/1947   Reynolds.......................... 214/8.5 K Primary Examiner—Gerald M. Forlenza
Assistant Examiner—George F. Abraham
Attorney, Agent, or Firm—Spencer & Kaye

[57] ABSTRACT

In a separating apparatus a prong serves as a magazine to receive annular work pieces. This prong is unilaterally held by an arrangement of at least two alternatingly closable connecting elements.

10 Claims, 2 Drawing Figures

PATENTED MAR 12 1974          3,796,324

APPARATUS FOR SEPARATING ANNULAR WORK PIECES

BACKGROUND OF THE INVENTION

The present invention relates to an apparatus for separating annular work pieces, particularly helical spring rings, and comprises a prong which is held on one side to serve as a magazine for the work pieces.

In order to further automatically process annular work pieces it is often necessary that they be brought individually to a machine unit in a certain rhythm. For this purpose the work pieces are brought to a reservoir magazine, either manually or by machine, and from here the pieces must then be individually guided along.

Separating devices are known in which annular work pieces, e.g. piston rings, are externally guided in stacks, and are also held so that the lowermost piece in the stack can be laterally displaced by means of a pusher.

To separate less rigid pieces, such as helical spring rings in particular, the known separating devices cannot be used. This is so because the radially attaching forces of the pushers, mounts or the like tends to deform the annular shape of the pieces so that defined separation, guidance and further conveyance of such pieces is not possible.

SUMMARY OF THE INVENTION

It is therefore the object of the present invention to provide apparatus which permits continuous separation of flexible annular work pieces and avoids the problems encountered in previously known apparatus. It is a further object to provide an apparatus in which annular work pieces with differently sized diameters can be separated without any special adjustments.

In general the apparatus, according to the invention, is used in an arrangement in which the annular work pieces that are to be separated are placed, either manually or with the aid of known conveying devices, onto a unilaterally held magazine prong. Because such apparatus can receive different sizes of work pieces, the diameter of this prong is chosen to be less than the smallest ring diameter within the possible ring diameter range.

According to the present invention, the prong, which serves as the magazine, is held by at least two alternately adjustable connecting elements. This makes it possible to charge the magazine continuously, or intermittently, from one end of the prong or magazine while the work pieces are individually discharged in a rhythmic pattern from the opposite end of the prong.

In order to substantially prevent the effects which result when external forces are applied to a flexible annular work piece, it is further proposed to have the prong slightly inclined with respect to the horizontal so that when the magazine is being charged, the pieces slide onto the prong under their own weight.

The connecting elements, which can alternatingly be set and reset, are preferably designed as substantially vertically superimposed plug-in connections that can be inserted into, and retracted from, corresponding recesses in a frontal face of the prong. For this purpose linearly guided pusher members with bolts at one end are provided. Preferably the guides for these pusher members converge at an acute angle in the direction toward the prong so as to produce an automatic braking effect during the respective closing of a plug-in connection. This prevents the prong from falling out of the apparatus.

In addition, the present invention consists of a special arrangement of the plug-in connections. Advantageously at least two permanently connected cylindrical bolts are provided at the end of the pusher members for each plug-in connection in order to prevent rotation of the prong about its longitudinal axis. It is also conceivable, however, that instead of two cylindrical bolts, only one bolt with a cross section other than circular can be used.

In order to assure accurate guidance of the work pieces to be separated, as well as mounting of the prong, the ends of the pusher members are provided with abutment surfaces which extend parallel to the associated perpendicular frontal face of the prong.

A further feature is the arrangement of a stripper in the shape of a plate with openings through which the pusher members and bolts of the plug-in connection can pass.

In the apparatus the pusher members are driven pneumatically so as to attain a relatively high timing pattern for separating the work pieces.

Consequently it is possible, by using an arrangement according to the present invention of a unilaterally clamped magazine prong, to push annular work pieces onto the free end of the prong in a continuous manner, or in packets, and these pieces can then be individually slid off the other prong end in a rhythmic pattern.

DESCRIPTION OF THE PREFERRED EMBODIMENT

Figure 1:
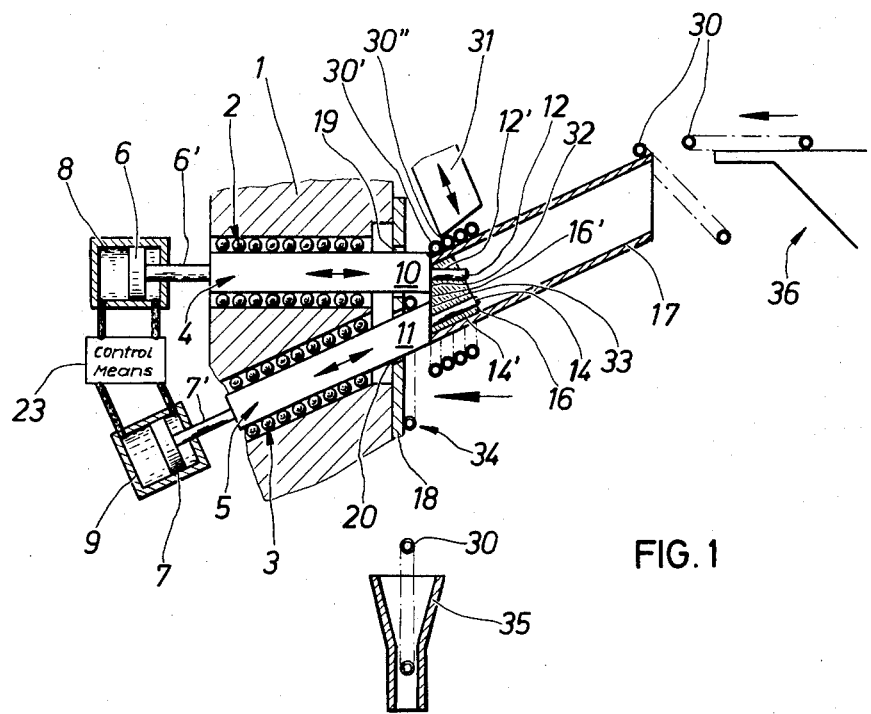
FIG. 1 is a schematic side view of the separating apparatus according to the invention partially in section.
Figure 2:
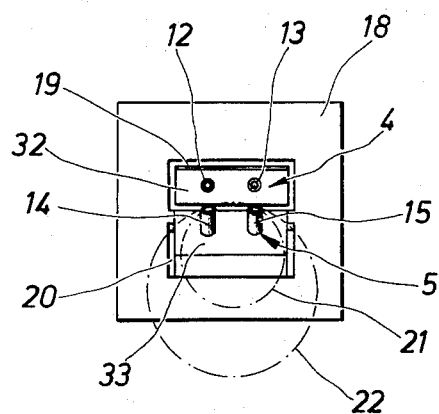
FIG. 2 is a view of the frontal side of a portion of the apparatus as viewed in the direction of the single pointed arrows in FIG. 1.

As seen in FIG. 1, a machine housing 1, a portion only of which is shown, has two ball guides, generally indicated at 2 and 3. It will be observed that these guides converge, from left toward the right, at an acute angle and pusher members, generally indicated at 4 and 5, are guided within guides 2 and 3 respectively. The pusher member 4 is attached, via piston rod 6' to a piston 6 within pneumatic cylinder 8, and in a corresponding manner pusher member 5 is connected by piston rod 7' to piston 7 within the pneumatic cylinder 9.

By means of suitable control means, shown in box form at 23, the pistons 6 and 7 can be moved within their respective cylinders and such action, of course, causes a linear movement of pusher members 4 and 5 within their guides 2 and 3, as indicated by the double-headed arrows on these members. As will be described in more detail later, the pusher members can be alternately moved.

The ends of the pusher members 4 and 5, opposite the pneumatic drive means, are designated by the reference numerals 10 and 11 respectively. The end surfaces at the ends 10 and 11 are designated 32 and 33, respectively, and two adjacently disposed bolts 12 and 13 extend from end surface 32, while bolts 14 and 15 extend from end surface 33. While these bolts are shown to be cylindrical in shape it will be understood that the shape of these bolts may be other than cylindrical if desired. Also if desired, a single bolt can be used on each pusher member and this bolt will be non-cylindrical in shape.

A lock portion 16 with a frontal vertical wall surface 16' is disposed within a tubular prong 17. As best seen in FIG. 1, recesses 12' and 14' in lock portion 16 are designed to receive bolts 12 and 14. While not shown, corresponding recesses are provided in lock portion 16 to accommodate bolts 13 and 15. It will be appreciated that this arrangement of bolts and associated recesses provides, in effect, a plug-in connection.

With respect to this plug-in connection it should be apparent that each of the pusher members, with its bolts, is a closable connecting element associated with the lock portion 16. Such connecting elements are substantially vertically aligned. End surfaces 32 and 33 are abutment surfaces for the vertical wall surface 16' of lock portion 16.

A stripper plate 18 is permanently connected to the machine housing 1. Perforations 19 and 20 in this stripper 18 provide openings thru which pusher members 4 and 5 extend in the manner shown in FIG. 1. In a manner to be discussed in more detail later, this stripper plate 18 provides a retaining wall surface for the annular work pieces at an intermediate position within the apparatus. A piece of this intermediate position is generally indicated at 34. Two annular work pieces with different diameters are also shown in this intermediate position by means of dot-dash lines 21 and 22.

A clamping mount shown generally at 31, is positioned above the lower end of the tubular prong 17 and is reciprocable as indicated by the double-headed arrow. Clamping mounts of this nature are well known in the art and it is not believed necessary to describe or illustrate this clamping mount in detail. The function of the clamping mount 31 will be discussed below.

As shown at the right hand side of FIG. 1, the annular work pieces, which in this case are helical spring rings 30, arrive at the apparatus via a suitable conveying means generally indicated at 36. A collecting trough 35 of a machine, not shown, for further processing the rings 30 is positioned below the stripper plate 18.

A plurality of rings 30 are shown carried on the tubular prong 17, serving as a magazine, at the lower end thereof. The two lowermost rings are designated as 30' and 30''.

The apparatus operates in the following described manner.

The helical spring rings 30 which are arriving at the apparatus, via the conveying means 36 at irregular intervals, drop onto the tubular prong 17, which is disposed at an angle to the horizontal, and there form a row. The clamping mount 31 releases always only the lowermost ring 30' for individual further conveyance, i.e., the ring which is in contact with the abutment surface 32 of pusher 4.

If now the upper pusher 4 is retracted to the left by its pneumatic drive means, the helical spring ring 30' is also moved to the left via bolts 12, 13 of pusher member 4 until the ring 30' is stripped off the bolts 12 and 13 by stripping plate 18 and falls, due to its own weight, onto the lower pusher member 5 which at this time is the only thing holding prong 17.

Pusher member 4 is then returned by its pneumatic drive means to its closed position shown in FIG. 1 and it should be noted that the arrangement of the two pusher members 4, 5 at an acute angle produces an automatic braking effect with respect to the prong 17 so that it cannot be expelled by the unavoidable friction forces although it is being held only at one end.

The helical spring ring 30 is now in the intermediate position 34, as shown in FIG. 1, between the upper pusher member 4 and the lower pusher member 5. Now the lower pusher member 5 is retracted to the left by its pneumatic drive means and the helical spring ring 30 is stripped off the bolts 14, 15 of the lower pusher member 5 by the stripping plate 18 so that it falls freely into the collecting trough 35.

Then pusher member 5 is advanced again to its closed position by the pneumatic drive means. At the same time the clamping mount 31 releases the next helical spring ring 30'' and the process is repeated.

It will be understood that the above description of the present invention is suceptible to various modifications, changes and adaptations, and the same are intended to be comprehended within the meaning and range of equivalents of the appended claims.

I claim:

1. Apparatus for separating annular work pieces, comprising in combination,
   a. a prong serving as a magazine to receive the work pieces;
   b. means for unilaterally supporting said prong including at least two moveable connecting elements associated with one end of said prong and providing the sole support for said prong; and
   c. means associated with said elements for moving said elements, alternately, into and out of engagement with said prong.

2. Apparatus as defined in claim 1, wherein said prong is inclined upward with respect to the horizontal.

3. Apparatus as defined in claim 2, wherein said connecting elements are substantially vertically aligned for plug-in connection with said prong.

4. Apparatus as defined in claim 3, wherein said connecting elements each consist of a linearly moveable pusher member, and at least one bolt extending from the one end of said pusher member adjacent said prong, said bolts being receivable in corresponding openings in an adjacent frontal wall surface of said prong.

5. Apparatus as defined in claim 4, wherein said pusher members are guided for lineal movement in guide means that converge together at an acute angle in the direction of said prong.

6. Apparatus as defined in claim 5, wherein each of said pusher members has two adjacently disposed cylindrical bolts.

7. Apparatus as defined in claim 4, wherein said bolts have a non-circular cross section.

8. Apparatus as defined in claim 5, wherein each of said pusher members is moved linearly by pneumatic drive means.

9. Apparatus as defined in claim 4, wherein each of said pusher members has an end surface which is parallel to and in facing relationship with said adjacent frontal wall surface of said prong for selective abutment therewith.

10. Apparatus as defined in claim 9, wherein a stripping plate is disposed to enclose said pusher members and in facing relationship with said adjacent frontal wall surface.

* * * * *